United States Patent [19]

Jordan et al.

[11] 3,999,359
[45] Dec. 28, 1976

[54] TOBACCO HARVESTER HAVING A HYDRAULIC CONTROL SYSTEM FOR AUTOMATICALLY AND CONTINUOUSLY CONTROLLING THE SPEED OF A LEAF DEFOLIATOR ASSEMBLY IN RELATION TO THE HARVESTER GROUND SPEED

[75] Inventors: Bertram Lee Jordan; John Davis Mitchell, both of Lewiston, N.C.

[73] Assignee: Harrington Manufacturing Company, Lewiston, N.C.

[22] Filed: May 20, 1975

[21] Appl. No.: 579,195

[52] U.S. Cl. .................................. 56/27.5; 56/10.2
[51] Int. Cl.² .......................................... A01D 45/16
[58] Field of Search ................. 56/27.5, 10.2, 10.3, 56/10.4

[56] References Cited

UNITED STATES PATENTS

| | | | |
|---|---|---|---|
| 3,093,946 | 6/1963 | Pitt et al. | 56/10.2 |
| 3,093,949 | 6/1963 | Splinter | 56/27.5 |
| 3,470,681 | 10/1969 | Saemann | 56/10.2 |
| 3,589,109 | 6/1971 | Payne | 56/10.2 |
| 3,603,064 | 9/1975 | Pinkham | 56/27.5 |
| 3,606,742 | 9/1971 | Wieneke et al. | 56/10.2 |

*Primary Examiner*—Russell R. Kinsey
*Attorney, Agent, or Firm*—Mills & Coats

[57] ABSTRACT

A tobacco harvester having a hydraulic control system for automatically and continuously controlling and maintaining the speed of a leaf defoliator assembly relative to and in proportion to the ground speed of the tobacco harvester. The hydraulic control system is adapted to continuously control the horizontal rearward speed component of the defoliating elements of a leaf defoliator assembly such that the defoliating elements move rearwardly during leaf defoliation at approximately the same speed the harvester is moving forward.

To provide for continuous speed control of the defoliator assembly, the hydraulic speed control system is operative to continuously effectively sense or monitor harvester ground speed and to continuously drive the defoliator assembly in proportion to the effectively sensed or monitored ground speed. In addition, the output of said hydraulic control system for controlling the speed of the defoliator assembly can be varied independently of harvester ground speed in order to synchronize or adjust the horizontal rearward speed component of the defoliating elements associated with said defoliator assembly to equal or nearly equal the forward ground speed of the harvester. Thus, the speed of the defoliator assembly is not only controlled and driven in proportion to the harvester ground speed, but the horizontal rearward speed component of the defoliating elements are driven at a speed approximately equal to the harvester ground speed. Consequently, once a certain speed relationship is established between the defoliator assembly and the harvester ground speed, this same speed relationship continues to exist for any and all harvester speeds. The result is that the defoliating elements during leaf defoliation move inwardly into the plane of the stalk row and outwardly therefrom in a continuous synchronized relationship with the passing tobacco stalks without significantly bending, breaking or cutting the stalks passing through the defoliator assembly.

8 Claims, 7 Drawing Figures

TOBACCO HARVESTER HAVING A HYDRAULIC CONTROL SYSTEM FOR AUTOMATICALLY AND CONTINUOUSLY CONTROLLING THE SPEED OF A LEAF DEFOLIATOR ASSEMBLY IN RELATION TO THE HARVESTER GROUND SPEED

The present invention relates to tobacco harvesters, and more particularly to a tobacco harvester having hydraulic speed control system for controlling the speed of a tobacco leaf defoliator assembly associated with the tobacco harvester.

BACKGROUND OF THE INVENTION

W. E. Splinter in U.S. Pat. No. 3,093,949 discloses a tobacco leaf defoliator assembly that is commonly referred to today as a knife head type defoliator. Structurally the Splinter Knife Head Defoliator comprises a pair of inclined and laterally spaced defoliator units that in operation are generally disposed on opposite sides of a tobacco row, and are designed to allow the individual stalks of the row to pass therethrough as the defoliator assembly is moved along the tobacco row by a tobacco harvester.

From a study of the Splinter disclosure, it will be seen that as the defoliator assembly moves along the tobacco row certain sets of knife blades move inwardly from opposite sides of the row to project through the plane of the tobacco row adjacent and between the respective stalks passing through the defoliator assembly. After the knife blades have moved to a position where they project adjacent and between successive stalks, the defoliator assembly then drives these blades upwardly and rearwardly relative to the harvester. As the blades move upwardly adjacent respective stalks, they engage certain tobacco leaves extending from the stalks and defoliate them therefrom, while the rearward component enables the blade to move rearwardly as the harvester moves forwardly. Because certain sets of knife blades at least partially surround the stalk while the defoliator assembly is moving along the row, the horizontal speed which may be referred to as the horizontal speed component of the knives projecting into the plane of the stalk row during defoliation, should generally be equal and opposite the forward ground speed of the harvester. It is appreciated that if the horizontal speed or movement of the knives is significantly faster or slower than the ground speed of the harvester that the knives will engage, bend and even cut through the stalks, thereby seriously damaging the tobacco crop.

In driving the Splinter type knife defoliator some form of a speed relationship should exist between the speed of the defoliator assembly and the ground speed of the tobacco harvester carrying the defoliator assembly. But how to establish a definite and continuous speed relationship between the defoliator assembly and the harvester ground speed has been the principal problem confronted by the Splinter type knife defoliator, and the lack of such a speed control system has been responsible, in part at least, for the failure of the Splinter defoliator to gain complete farmer acceptance.

The Splinter Knife Defoliator has been used in the past as a defoliator head for automatic tobacco harvesters. Such harvesters have utilized a hydraulic drive for driving the Splinter Defoliator, and for varying the speeds thereof there has been provided a purely manual control disposed adjacent the operator's station. As the harvester moves through the field, the operator has the responsibility of judging the harvester ground speed and manually adjusting the speed of the defoliator to where the rearward horizontal speed of the knives is thought to be approximately equal to the harvester ground speed. Alternatively in such cases, the operator in some instances may set the defoliator speed at a constant speed and attempt to adjust the ground speed of the harvester to a speed that will approximately equal the horizontal speed component of the knives.

Needless to say, such methods of controlling the defoliator speed are quite imprecise, and often impractical and essentially unworkable except with the most skilled operators. During the harvesting operation, the operator must give his attention to steering the harvester through the field, and observing the defoliator and leaf conveying processes that are taking place. There is not sufficient time under ordinary conditions to give proper attention to these tasks, and other routine operator responsibilities and also to continuously judge the ground speed of the harvester and attempt to adjust the speed of the defoliator to synchronize the knives with the passing stalks. This is even more difficult because in the tobacco harvesting operation there are numerous occasions where the speed of the harvester changes and often these changes are very sudden and abrupt changes. For example, at the beginning and end of each row, the speed of the harvester is sometimes slower than the average speed in the open field since the operator must negotiate turning at the end of each row. Also, it becomes necessary to slow down the harvester in the open field due to gullies or other type of irregularities in field terrain. In such situations to avoid the cutting of the stalks, it is necessary for the operator to foresee these changes in ground speed and to timely make the proper manual speed adjustments for the defoliator at the same time the harvester is either speeding up or slowing down in order to avoid substantial damage to the tobacco crop. Even in cases where the operator is skilled and has extensive field experience with such a manual control, it is not possible for the operator to continuously and precisely manually control the speed of the defoliator assembly relative to harvester ground speed, and thus there will always be some crop damage. Skilled and experienced operators are not plentiful or readily available and therefore the operators of such tobacco harvesters are usually unskilled and inexperienced. In these situations, one can expect substantial crop damage where the unskilled and inexperienced operator has to manually control the speed of the defoliator assembly based solely on a judgment of harvester ground speed.

SUMMARY OF THE INVENTION

Basically the present invention entails a tobacco harvester having a hydraulic control system for continuously and automatically varying and maintaining the speed of a leaf defoliator relative to and in proportion to the ground speed of the tobacco harvester as the harvester moves through a tobacco field harvesting tobacco.

In particular, the hydraulic control system associated with said harvester has the capability to continuously effectively sense or monitor harvester ground speed and variations therein, and to respond to the effectively sensed or monitored ground speed by driving said defoliator assembly in proportion to the harvester ground speed. In addition, the hydraulic defoliator speed control system is further provided with a secondary control adjustment or speed synchronizer for adjusting and setting the volumetric fluid output of the hydraulic control system so as to achieve a particular speed relationship between the defoliator assembly and the harvester ground speed for a complete range of harvester speeds. For example, the secondary control adjustment may be set to where the volumetric fluid output drives the defoliator assembly at a speed such that the horizontal speed of the defoliator knives or elements at any time generally equal the ground speed of the harvester irrespective of the harvester ground speed or variations therein. Thus, the secondary control adjustment of the hydraulic control system is effective to adjust the defoliator speed such that the rearward horizontal speed of the defoliator elements, at least during leaf defoliation, is not only proportional to harvester ground speed but is generally equal to harvester ground speed and varies generally directly in a one-to-one relationship therewith. Consequently, the horizontal rearward speed of the defoliating elements can be made to equal or nearly equal the harvester ground speed without regard to the mechanical gearing and the ratios thereof operatively connected between the hydraulic control system and the defoliator assembly.

In one preferred embodiment disclosed herein, the hydraulic control system for continuously controlling the rearward speed of the defoliator elements comprises a main hydraulic motor operatively connected to a hydraulic wheel drive system that functions to directly drive the wheels of the tobacco harvester. Drivingly connected to the hydraulic motor is a variable displacement hydraulic pump that is operatively connected to a fluid source and adapted to continuously drive a second hydraulic motor (also referred to as the hydraulic defoliator motor) which in turn drives the defoliator assembly. The rate at which the second hydraulic motor is driven can be varied by adjusting the angular position of a swashplate (referred to as secondary control) within the variable displacement pump of the hydraulic control system.

In operation, as the harvester is propelled through the field, the fluid flow through the hydraulic wheel drive system also drives the main hydraulic motor of said hydraulic speed control system, which in turn results in the variable displacement pump being driven and consequently the second hydraulic motor operatively connected to the defoliator assembly. The angle of the swashplate is set such that the fluid output of the variable displacement pump will drive the hydraulic defoliator drive motor at a certain speed that will result in the rearward horizontal speed of the knives or defoliating elements being driven at a speed generally equal to the forward harvester ground speed. After this setting is made, it follows that the rearward horizontal speed of the knives or defoliating elements will vary directly in a general one-to-one relationship with variations in the harvester forward ground speed, except where it may be desirable to drive the knives or defoliating elements in an "advance" or "retarded" relationship with respect to ground speed. Therefore, it follows that the hydraulic control system is only actuated and driven when fluid is flowing through the hydraulic wheel drive system, and accordingly, the hydraulic control system for controlling the speed of the defoliator is always driven at a speed or RPM proportional to the ground speed of the tobacco harvester.

It is, therefore, an object of the present invention to provide a hydraulic defoliator speed control system for a tobacco harvester that continuously and automatically controls and maintains the rearward speed of the leaf defoliator elements generally equal to the harvester forward ground speed.

A further object of the present invention is to provide a hydraulic control system which in effect continuously senses and monitors the ground speed of a tobacco harvester and responds to this sensed or monitored ground speed by automatically and continuously driving the leaf defoliator elements at rearward speed generally equal to the ground speed of the harvester.

Still a further object of the present invention is to provide a hydraulic speed control system for continuously driving a defoliator assembly relative to and in proportional to the ground speed of a tobacco harvester having the defoliator assembly mounted thereon and wherein the fluid output of said hydraulic control system utilized for driving said defoliator assembly can be adjusted such that a particular proportional speed relationship can be established between the harvester ground speed and the speed of the defoliator assembly.

A further object of the present invention is to provide a hydraulic speed control system for automatically controlling and maintaining the speed of a tobacco harvester defoliator assembly, including defoliating elements that project into the plane of the tobacco stalk during leaf defoliation, such that the horizontal rearward speed of the individual defoliating elements during leaf defoliation is generally equal and opposite the harvester forward ground speed, thereby enabling tobacco stalks to pass through and in operative relationship with the defoliating assembly and to be generally surrounded by the defoliating elements thereof without being bent, broken or damaged during the defoliating process.

Another object of the present invention is to increase the efficiency of a tobacco leaf defoliator by providing a hydraulic speed control system for automatically and continuously controlling and maintaining the rearward horizontal speed of the defoliating elements comprising the leaf defoliator assembly during leaf defoliation at a speed generally equal and opposite the harvester forward ground speed, thereby enabling the defoliating elements to be positioned such that during the leaf defoliation they move relatively close to the respective tobacco stalks and defoliate the particular leaves closely adjacent the stalks.

A further object of the present invention is to increase the practicality and farmer acceptance of the Splinter type Knife Head Defoliator Assembly by providing a hydraulic speed control system for continuously controlling and maintaining the speed of the Splinter type Defoliator Assembly in proportion to the ground speed of the harvester carrying the defoliator assembly.

Other objects and advantages of the present invention will become apparent from a study of the following description and the accompanying drawings which are merely illustrative of the present invention.

DESCRIPTION OF THE PREFERRED EMBODIMENT

Figure 1:
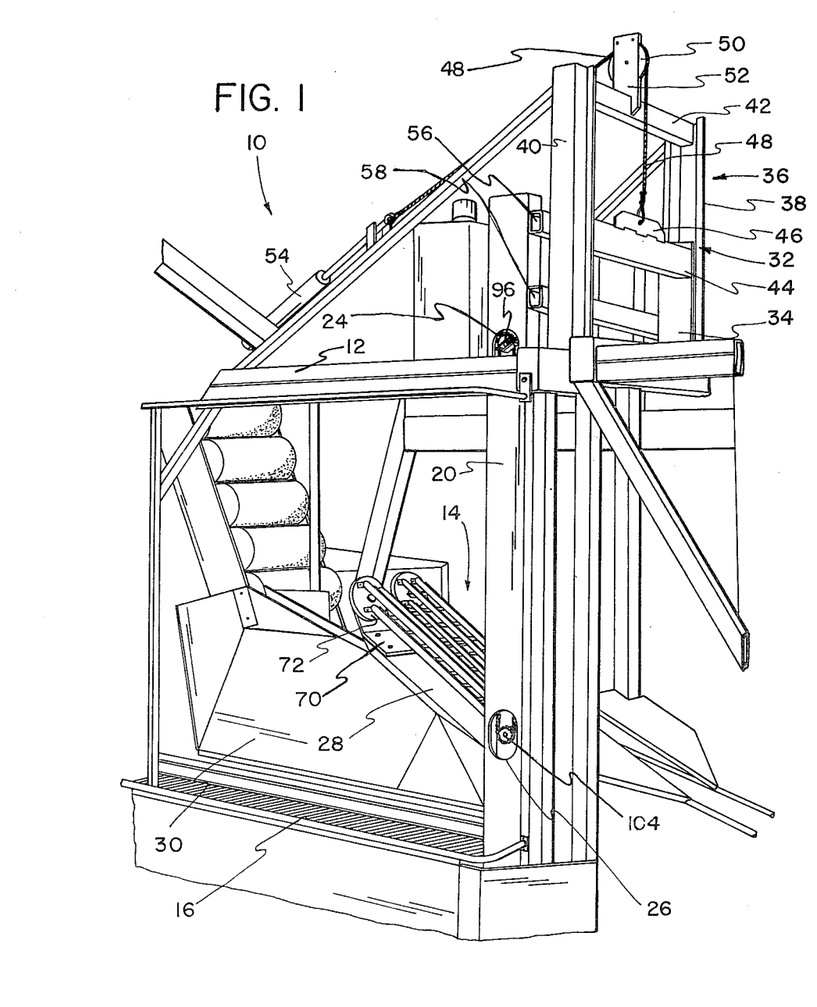
FIG. 1 is a fragmentary perspective view of a self-propelled high clearance automatic tobacco harvester having a Splinter type Knife Head Defoliator Assembly mounted thereon.

With further reference to the drawings, particularly FIG. 1, a fragmentary portion of an automatic tobacco harvester is shown therein, the harvester being indicated generally by the numeral 10 and including a defoliator assembly, indicated generally at 14, mounted thereon.

First, generally reviewing the tobacco harvester 10, it should be pointed out that the harvester illustrated in FIG. 1 is of the self-propelled high clearance type presently being produced and sold by Harrington Manufacturing Company. This type of harvester includes a wheel supported main frame 12 and a longitudinal side conveyor assembly 16 disposed on each side of the defoliator assembly 14 and adapted to receive defoliated leaves during the harvesting operation as the harvester moves through the field. Once the tobacco leaves are received by each of the longitudinal side conveyor assemblies 16, the tobacco leaves are conveyed rearwardly and upwardly to a collection area about the rear of the harvester 10. Typically, the leaves are discharged into a trailer or the like and after filling the same to a predetermined level, the volume of tobacco leaves received are transported to a curing and drying structure where the tobacco leaves are loaded into racks and the racks are placed in the structure for curing and drying.

Details of the automatic tobacco harvester are not discussed herein since they are not material to the present invention and since such harvesters are well known and appreciated by those skilled in the art. For a complete and unified understanding of automatic tobacco harvesters, one is referred to the commercially available conventional self-propelled tobacco harvesters being produced by Harrington Manufacturing Company. In addition, the Pinkham et al disclosure found in U.S. Pat. No. 3,841,071 also illustrates a self-propelled automatic tobacco harvester, and the disclosure of this patent is expressly incorporated herein by reference.

The present invention relates to a hydraulic speed control system for continuously controlling the speed of a leaf defoliator assembly such as the defoliator assembly 14 shown mounted on the harvester 10 in FIG. 1 and particularly illustrated in the accompanying drawings. Defoliator 14 is of the type shown and disclosed in U.S. Pat. No. 3,093,949 issued to W. E. Splinter, and accordingly, this type of defoliator assembly has become known as the Splinter Knife Head type Defoliator. U.S. Pat. No. 3,093,949 to Splinter is hereby expressly incorporated herein by reference.

Although the basic structure of the Splinter type Defoliator 14 is known in the art, it will be beneficial to basically review the structure and function thereof, and the manner of mounting the same to the tobacco harvester 10.

Because the Splinter type defoliator 14 is designed to operate at different heights in order to accommodate different priming levels, it is necessary that the defoliator unit be mounted on a vertically adjustable frame structure. Viewing this frame structure in detail, it is seen that the same includes a pair of vertical tubular members 20 and 22, each member including a pair of vertically spaced access openings formed on the outer side of each, these access openings being referred to as an upper access opening 24 and a lower access opening 26.

Fixed to the lower end of each vertical member 20 and 22 is an upwardly and rearwardly inclined cantilever beam 28 that supports a downwardly and outwardly inclined leaf guide assembly 30 on the outer side of each. From subsequent portions of the disclosure, it will be appreciated that as the defoliator assembly 14 defoliates tobacco leaves from tobacco stalks during the harvesting operation, that the leaves defoliated will fall outwardly from each side of the defoliator assembly 14 and be guided downwardly and outwardly to each of the longitudinal side conveyor assemblies 16 by each of the leaf guide assemblies 30.

Both vertical members 20 and 22 extend upwardly to where the upper portions thereof are connected to a carriage assembly 32 movably mounted for vertical reciprocal movement in a carriage frame 36 having a pair of laterally spaced inwardly open channels 38 and 40. Channels 38 and 40 are fixed to the main frame 12 of the tobacco harvester and extend upwardly therefrom where a cross member 42 is fixed to the upper portion thereof and extends transversely thereacross.

Viewing the carriage 32 (FIG. 1), it is seen that the same comprises a pair of laterally spaced side runners 34 (only one of which is shown) that move up and down along the inner side of respective inwardly open channels 38 and 40, each side runner including roller wheels (not shown) that move up and down along the inside of channels 38 and 40. Extending transversely across the side runners 34 is a cross member 44, and a pair of carriage arms 56 and 58, the carriage arms being rearwardly spaced behind the carriage frame 36 and vertically spaced in order that the vertical members 20 and 22 supporting the defoliator assembly 14 can be appropriately mounted by hooks or the like to either one. It is appreciated that the height of the defoliator assembly 14 can be adjusted with respect to the main frame 12 of the harvester by fastening respective points of the vertical members 20 and 22 to either one of the carriage arms 56 and 58.

Fixed to the upper edge of the cross member 44 of the carriage 32 is a clevis 46 that includes an opening therein for receiving a cable 48 which extends upwardly therefrom and is trained around a pulley 50 rotatively mounted in a pulley mount 52 that is fixed to and extends upwardly from the cross member 42 of the carriage frame 36. The cable 48 extending rearwardly from the pulley 50 is appropriately fixed to the rod end of a remotely controlled hydraulic cylinder 54. Therefore, it is appreciated that by actuating the hydraulic cylinder 54 that the vertical height of the defoliating unit 14 can be adjusted relative to both the main frame 12 of the harvester and the stalks of tobacco that are to be harvested.

Disposed on the lower front portions of the vertical members 20 and 22 is a pair of guide panel assemblies 60 and 62. The guide panel assemblies include a pair of elongated members 64 and 66 fixed thereto and which project forwardly thereform so as to define a row inlet opening indicated generally by the numeral 68 between the elongated members and the guide panel assemblies 60 and 62.

Figure 2:
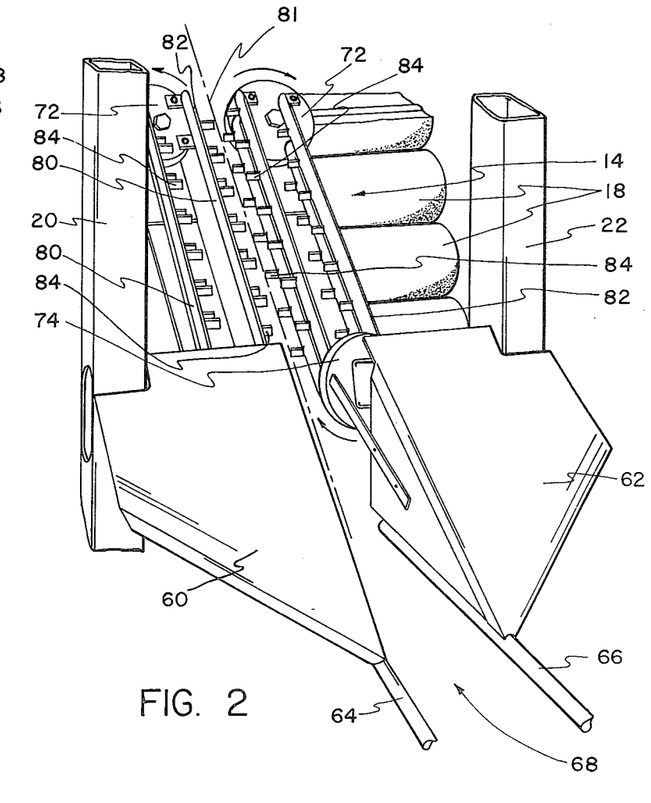
FIG. 2 is a fragmentary perspective view of the Splinter type Knife Defoliator Assembly, particularly illustrating the transversely extending knives or defoliator elements that during harvesting project into the plane of the tobacco stalk row as the defoliator assembly straddles and moves along a row of tobacco.
Figure 3:
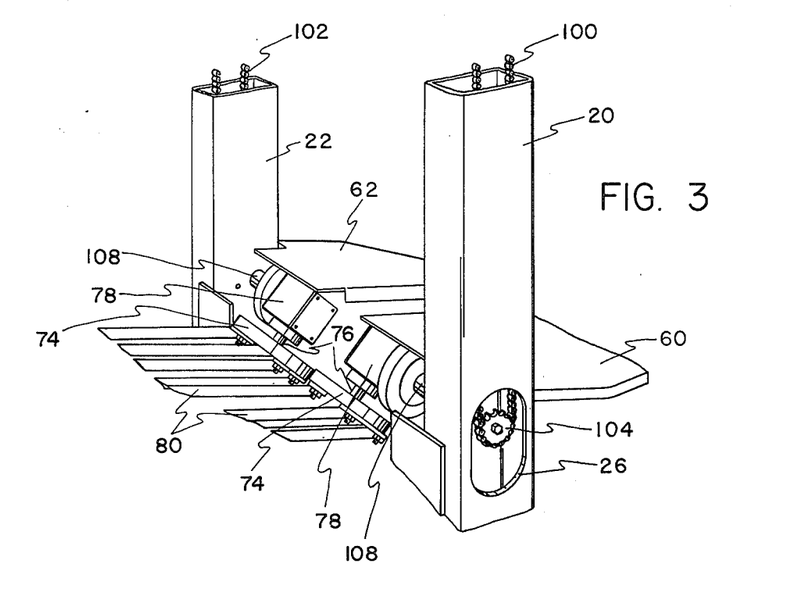
FIG. 3 is a fragmentary perspective view of a lower front portion of the Splinter Knife Head type Defoliator Assembly.

Turning now to a discussion of the defoliating assembly 14, as seen in FIG. 2, the defoliating assembly is basically made up of cooperating left and right-hand defoliating units. Each unit includes a rear rotor plate 72 rotatively mounted (within a bearing assembly) about an inclined axis to a mounting plate 70, said mounting plate fixed to a respective beam 28 about the rear end thereof and extending upwardly therefrom for supporting the rear rotor plate 72 in an inclined plane. Aligned with each rear rotor plate 72 is a forward rotor plate 74 (FIG. 3), the forward rotor plate 74 being disposed in a position forwardly and below the corresponding rear rotor plate 72 but yet being disposed in a plane that is generally parallel to the plane of the corresponding rear rotor plate 72. Each forward rotor plate 74 is fixed to an output shaft 76 of a respective forwardly mounted right angle gear box 78.

Extending between respective rearward and forward rotor plates 72 and 74 is a series of elongated members 80, each member being connected at opposite ends by a bearing assembly to a respective rotor plate. The elongated members 80 are generally equally and circumferentially spaced about the respective rotor plates 72 and 74.

Disposed along each elongated member 80 is a longitudinal blade 82 having an upper cutting edge formed thereon. Extending inwardly from each elongated member 80 is a series of axially spaced transversely extending blades or defoliating elements 84.

It is seen from the foregoing and a study of the Splinter Patent that to properly drive the defoliator unit 14 corresponding rear and front rotors are effectively driven counter to each other and this causes each elongated member 80 and the defoliating blades 82 and 84 associated therewith to be driven through a cycle.

Figure 5:
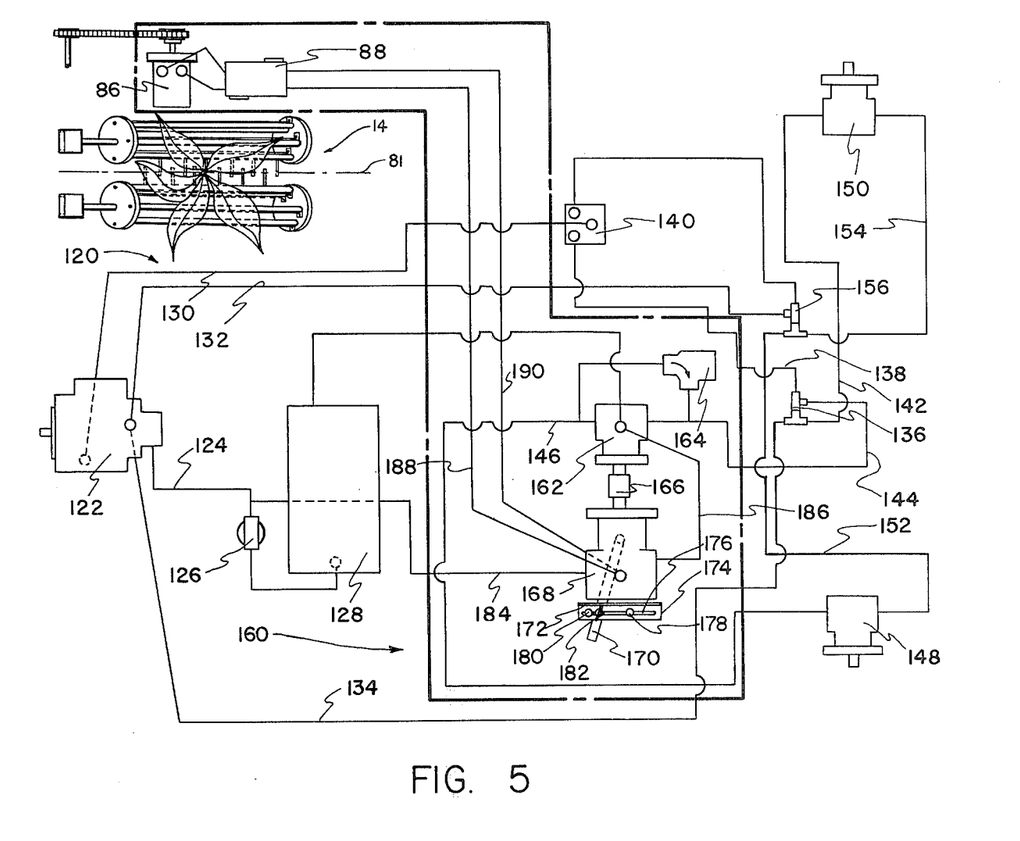
FIG. 5 is a schematic diagram illustrating one embodiment for the hydraulic defoliator speed control system of the present invention and its relationship with the harvester's hydraulic wheel drive system.

Briefly reviewing the defoliating cycle, it is seen that after the elongated members 80 have moved away from the plane of the row (represented by broken line 81 in FIG. 1) and slightly outwardly therefrom, they generally move downwardly and forwardly and from there the rotor plates 72 and 74 pull the same elongated member 80 inwardly until one set of the transversely extending blades 84 or the defoliating elements from each defoliating unit project into the plane of the tobacco row and the tobacco stalks of the row find themselves positioned between alternate successive blades 84 of the inwardly most disposed elongated members 80 of the left and right-hand defoliating units. After the elongated members 80 have been moved inwardly to where the transverse blades 84 thereof project into the plane of the tobacco row, it is seen that the counter rotation of the rotor plates 72 and 74 cause the elongated members to move upwardly and rearwardly due to the inclined nature of the defoliating assembly 14. It is this portion of the cycle where leaf defoliation actually takes place and accordingly, throughout this disclosure, it is this part of the cycle that is referred to as the leaf defoliation portion of the cycle. It is important to realize that the left and right-hand units of the defoliating assembly are so phased and arranged that respective elongated members 80 of each left or right-hand defoliating unit cooperates with each other. This is to say that during leaf defoliation that the defoliator assembly 14 will be disposed on each side of the tobacco row being harvested and that during actual defoliation the stalk row will be operated on simultaneously by the defoliating blades and elements from both sides of the assembly. Consequently, as illustrated in FIG. 5, during the defoliating cycle, one will fnd a particular stalk passing through the defoliating unit 14 to be at least partially surrounded by a longitudinal blade 82 on both sides of the stalk and a pair of transversely extending blades or defoliating elements 84 projecting inwardly into the plane of the row from opposite sides of the defoliating unit 14. The leaves of the stalk are defoliated by the upward movement of the defoliating blades 82 and 84 as the innermost elongated members 80 on each side of the unit move both vertically and rearwardly. Because the tobacco stalks are surrounded by the transversely extending blades that project into the tobacco row and because the harvester is moving forwardly, it is desirable to control the rearward horizontal speed of the transversely extending blades 84 with respect to ground speed in order that the transversely extending blades do not break, bend or damage the stalks passing through the defoliator assembly 14.

Figure 4:
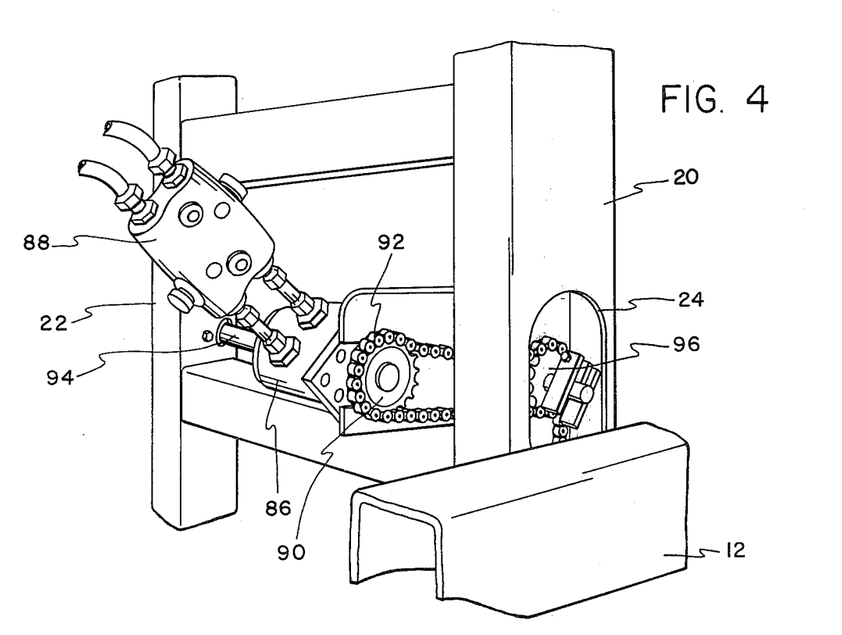
FIG. 4 is a fragmentary perspective view of an upper portion of the frame structure supporting the defoliator assembly, illustrating a hydraulic motor mounted thereon for driving a transverse jack shaft mounted within the frame structure.

In order to drive the defoliator assembly 14, a defoliator hydraulic drive motor 86 is provided and operatively connected to a cross-over relief valve 88 as shown in FIG. 4. As will be appreciated from subsequent portions of the disclosure, the hydraulic motor 86 forms a part of the hydraulic speed control system, and fluid under pressure is delivered thereto for driving a drive sprocket 90 which in turns drives a jack shaft 94 via a chain 92. Jack shaft 94 is appropriately journaled transversely across the vertical members 20 and 22 and is aligned with the upper access openings 24 formed on the outer side of each. Fixed to each end of the jack shaft 94 at a position interiorly of the vertical members 20 and 22 is a pair of upper sprockets 96. Sprockets 96 have a pair of chains 100 and 102 trained therearound and extending downwardly therefrom through respective tubular vertical members 20 and 22 to where the chains are trained around a pair of lower sprockets 104, the lower sprockets 104 being aligned with the lower access opening 26 formed on the outer side of each respective vertical members 20 and 22. Secured to each of the lower sprockets 104 is a drive shaft 108 that extends inwardly therefrom to where an inner portion thereof is operatively connected to a respective right angle gear box 78 which as already discussed is operative to rotatively drive either of the front rotor plates 74.

HYDRAULIC DEFOLIATOR SPEED CONTROL SYSTEM

With reference to the hydraulic schematic drawing of FIG. 5, it is seen that the same depicts and shows a hydraulic wheel drive system indicated generally by the numeral 120 that is adapted to drive, either forwardly or rearwardly, a pair of rear wheels (not shown) that support the harvester 10. Viewing the hydraulic wheel drive system in detail, it is seen that the same includes a variable displacement hydro-static transmission 122 of the common type used in hydro-static drive systems for vehicles, particularly agricultural machinery. From a reservoir 128 there extends a fluid inlet line 124 that is connected to hydro-static transmission 122 and includes a filter 126 connected therein. Leading from the hydro-static transmission 122 are three basic fluid lines, fluid line 134 which leads to a double tee assembly 136, fluid line 132 which leads to a second double tee assembly 156, and fluid line 130 which leads to a motor block valve 140.

From the double tee assembly 136 there is connected a line 138 which leads to the motor block valve 140. Also, extending from the double tee assembly 136 is a fluid line 142 that is operatively connected to a hydraulic wheel drive 150 that is of conventional design and adapted to drive the right-hand rear wheel of the harvester 10, the particular right-hand reference based on standing at the rear and facing toward the front of the harvester. Connected to the other side of the right-hand hydraulic wheel motor 150 is a fluid line 154 which extends back around and connects with the double tee assembly 156.

In addition, from double tee assembly 136, there is provided fluid line 144 which is operatively connected to a hydraulic drive motor 162 of the hydraulic defoliator speed control system shown herein and which will be discussed in greater detail subsequently herein. From the other side of the hydraulic motor 162, a line 146 extends and connects to a left-hand hydraulic wheel drive motor 148. Operatively connected to the other side of hydraulic wheel drive motor 148 is fluid line 152 which extends around to join the double tee assembly 156.

Operatively associated and integrated into the hydraulic wheel drive system 120 is a hydraulic defoliator speed control system enclosed within the blocked area of FIG. 5 and indicated generally by the numeral 160. Referring to this hydraulic defoliator speed control system 160 in detail, it is seen that the same comprises a hydraulic drive motor 162 operatively connected between fluid lines 144 and 146 and in series with wheel motor 148. In parallel with the hydraulic drive motor 162 is a check valve 164 that allows fluid flow from line 146 to line 144, but prohibits or checks the flow from line 144 to line 146 or in the direction opposite the arrow shown within the check valve symbol 164 of FIG. 5.

The hydraulic drive motor 162 is drivingly connected to a variable displacement hydro-static or hydraulic pump 168 through an interconnecting drive coupling 166. By being of the variable displacement type, the volumetric output flow from the pump can be varied independently of the driven speed. Variable displacement hydraulic pump 168 is of a conventional design such as produced by Sunstrand Hydro-Transmission Division of Sunstrand Corporation, Ames, Iowa. Because the design structure of such a variable displacement hydro-static pump is well known in the art and is not particularly material per se to this invention, only the basic function of such pump will be described herein with emphasis on the functional aspects of the pump relative to the hydraulic speed control system 160. Nevertheless, the hydro-static pump 168 is operatively connected to a fluid line 184 which is in turn connected to line 124 and as such is operatively connected to the reservoir 128. Hydro-static pump 168 also has connected to one port therein a fluid exiting line 186 which is routed by the hydraulic drive motor 162 and back to reservoir 128.

Figure 6:
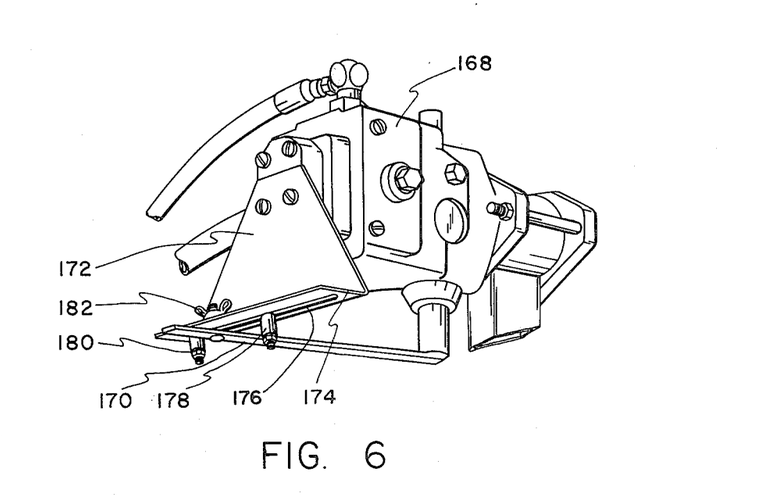
FIG. 6 is a fragmentary perspective view showing a variable displacement hydraulic pump of the type utilized within the hydraulic speed control system shown in FIG. 5, and particularly shows a device for setting a swing arm operative to adjust the swashplate of the pump.

Of prime importance insofar as the embodiment shown in FIG. 5 is concerned is that the hydro-static pump 168 is operative when driven by the hydraulic motor 162 to circulate or drive a system of fluid through lines 188 and 190, which as viewed in FIG. 5 is operatively connected to the cross-over relief valve 88 and the hydraulic motor 86 of the control system 160. Thus, in essence, the hydro-static pump 168 is operative to drive and circulate a system of hydraulic fluid through lines 188 and 190 while being driven by the flow of fluid from line 184, through the pump, and out line 186. Because the hydraulic pump 168 is a variable displacement type, the volumetric flow of fluid within lines 188 and 190 can be varied, independently of driven speed, by adjusting the angle of the swashplate therein. To provide for this adjustment, a swashplate adjustment arm 170 is operatively connected to the swashplate and extends therefrom and outwardly under a flange 174 that is turned outwardly from a support plate 172 fixed to the end of the hydraulic pump 168. Formed in the flange 174 is an elongated slot 176 and there is provided a pair of adjustable stops 178 and 180 that are secured in the elongated slot at proper intervals. There is also provided a wing nut assembly 182 that extends through the elongated slot 176 and through the swashplate adjustment arm 170, and it follows that the swashplate arm can be held stationary with respect to the hydro-static pump 168 by tightening the wing nut assembly such that the adjustment arm 170 is held stationary with respect to the flange 174.

OPERATION OF THE HYDRAULIC DEFOLIATOR SPEED CONTROL SYSTEM

In operation the hydro-static transmission 122, which is typically driven by an internal combustion engine mounted on the harvester is actuated through a hydraulic servo-control (not shown) to provide a fluid under pressure to either fluid lines 134 or 132. To move forwardly, the controls are so actuated that fluid under pressure is pumped through line 134, through double tee assembly 136 and into lines 142 and 144. From line 142, the fluid is pumped through the right-hand hydraulic wheel drive motor 150, causing the same to turn and to drive the wheel associated therewith, the fluid exiting the hydraulic wheel drive motor 150 through line 154, through double tee assembly 156 and back to the hydro-static transmission 122 via line 132.

To drive the left-hand hydraulic wheel drive 148, fluid from line 144 is pumped through the hydraulic drive motor 162 of the hydraulic speed control system 160, and then through line 146 into the left-hand hydraulic wheel drive motor 148. The flow of fluid through hydraulic wheel drive motor 148 causes the same to be turned and to accordingly drive the wheel associated therewith. Therefore, it is appreciated that as fluid flows from the hydro-static transmission 122 through line 134, that both hydraulic wheel drive motors 148 and 150 are driven. It should be pointed out that the fluid leaving the left-hand hydraulic wheel drive motor 148 exits through line 152, through double tee assembly 156, and back to the hydro-static transmission 122 through line 132.

As the harvester 10 is propelled forwardly through the field, that fluid flowing through line 144 is required to move through the hydraulic motor 162 since the check valve 164 prohibits the fluid from by-passing the same. It is also appreciated that the hydraulic motor 162 is always driven at a speed proportional to the speed of the left-hand hydraulic wheel drive motor 148 and consequently, it can thusly be stated that the hydraulic drive motor 162 is always driven in proportion to the forward ground speed of the harvester 10.

Because the hydraulic drive motor 162 is drivingly connected to the hydro-static variable displacement pump 168, it also follows that this pump is likewise driven in proportion to the forward ground speed of the harvester 10. By the nature of the variable displacement hydraulic pump 168, the volumetric output of the system circulating in lines 188 and 190 is proportional at all times to the driven speed of the hydraulic pump. Thus, it is appreciated that the defoliator hydraulic drive motor 86 is continuously driven at a speed proportional to the forward ground speed of the tobacco harvester, irrespective of changes in the harvester speed with time. Because the defoliator hydraulic motor 86 is always driven at a speed proportional to the forward ground speed of the harvester, it follows that the blades 82 and 84 or the defoliating elements of the defoliating assembly 14 are likewise driven continuously in proportion to the forward ground speed of the harvester 10.

In describing the defoliator assembly 14, it was pointed out that the transverse defoliating elements 84 during leaf defoliaton actually project into the plane of the tobacco stalk row and that during leaf defoliation respective sets of blades 84 on each side of the defoliator assembly approach and come close to the particular stalk being harvested. As the defoliator assembly moves forwardly the individual transversely extending knife blades 84 tend to move upwardly and rearwardly during leaf defoliation. The upward movement causes certain leaves to be defoliated from the stalk. The rearward movement, on the other hand, is to compensate for the forward travel of the defoliator assembly during the defoliating process and as such, its main purpose is to allow the stalks to pass through the defoliating assembly 14 without being bent, broken or damaged by the transversely extending knives or defoliating elements 84. Therefore, the importance of controlling the defoliator speed such that the rearward horizontal speed of the knives or defoliating elements 84 during leaf defoliation is generally equal and opposite the harvester ground speed is seen to be of prime importance.

To synchronize the hydraulic defoliator speed control system 160 to assure that the rearward horizontal speed of the transversely extending knives or defoliating elements 84 during leaf defoliation is approximately equal to the forward ground speed of the harvester 10, the swashplate adjustment arm 170 is adjusted and set such that for any given harvester ground speed the volumetric output of the hydraulic pump 168 will be such that the rearward horizontal speed of the defoliating elements 84 will be generally equal and opposite the harvester ground speed. This particular output of the hydro-static pump 168 is set by adjusting one of the stops 178 and 180 to the proper position within the elongated opening 176 and then moving the swashplate adjustment arm 170 thereagainst where the wing nut assembly 182 is tightened thereagainst. The other stop, 178 or 180, is positioned to where there is little or no fluid output and at this position, the tobacco harvester 10 can be driven from one field to another or along the highway without the defoliator assembly being driven.

Once the angle of the swashplate within the hydrostatic pump 168 has been properly set to completely synchronize the speed of the defoliating unit 14, it follows that because of the particular relationship between the hydraulic defoliator speed control system and the hydraulic wheel drive system, that the speed of the defoliator unit 14 is always maintained generally proportional to the harvester ground speed. Once the volumetric fluid output of the hydro-static transmission 168 has been adjusted to where the rearward horizontal speed of the defoliating elements 84 is equal to or generally equal to the harvester forward ground speed, it follows that a generally direct one-to-one proportional relationship will be maintained within the operative range of the hydraulic control system 160. Therefore, for a given change in harvester ground speed, the hydraulic control system 160 effectuates a corresponding change in the rearward horizontal speed of the defoliating elements 84 during leaf defoliation.

It should be noted that when the harvester is driven in the reverse direction that the fluid by-passes the hydraulic defoliator speed control system 160 through the check valve 164. More particularly, when driven rearwardly fluid from the main hydro-static transmission 122 enters lines 132 and moves through the double tee assembly 156. From the double tee assembly 156 fluid flows through lines 152 and 146, and around the hydraulic drive motor 162 through the check valve 164 and on through the double tee assembly 136 and back to the hydrostatic transmission 122 via line 134.

Figure 7:
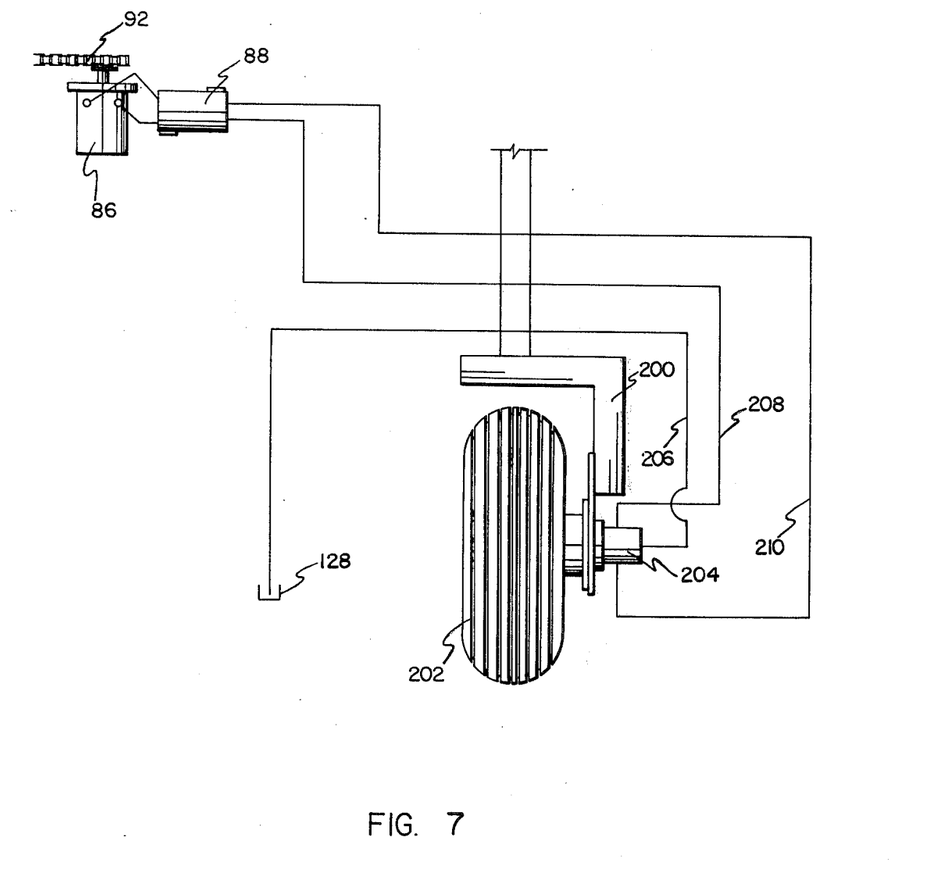
FIG. 7 is a schematic diagram illustrating an alternate embodiment for the hydraulic speed control system of the present invention.

In principle, the hydraulic defoliator speed control system of the present invention has the capability in effect to continuously sense or monitor harvester ground speed, and to automatically and continuously drive the defoliating assembly at a speed proportional to the effectively sensed or monitored ground speed, irrespective of changes in harvester ground speed. Within the purview of this control system principle, it is contemplated that an alternate design would entail the provision of a hydraulic pump directly driven by a wheel on the harvester (as illustrated in FIG. 7) or even indirectly driven by the wheel through a chain or the like, wherein the hydraulic pump would be operatively connected between a source of hdyraulic fluid and a hydraulic drive motor such as motor 86 shown in FIG. 4. Consequently, in such an alternate design, the hydraulic pump either driven directly or indirectly by at least one wheel would effectively continuously sense or monitor ground speed and the defoliating assembly would be driven in proportion to this effectively sensed or monitored ground speed. With reference to FIG. 7, such an alternate design is shown in which a hydraulic pump 204 is directly (or indirectly by a chain or the like) driven by a wheel 202 rotatively mounted to a wheel frame 200 of the tobacco harvester 10. In this alternate design, hydraulic pump 204 is driven by the wheel 202 and in the process pumps fluid from the reservoir 128 through line 206 to the hydraulic pump 204. From the hydraulic pump 204, the fluid is then circulated to the crossover relief valve 88 and the hydraulic motor 86 via lines 208 and 210. To achieve a desired synchronized relationship between the defoliating elements and the ground speed of the harvester 10, the hydraulic pump 204 is particularly selected and geared to provide a fluid output through lines 208 and 210 that will result in the defoliating elements being driven in a synchronized relationship with respect to harvester ground speed irrespective of changes in the harvester ground speed during the tobacco harvesting operation.

Still within the basic purview of this control principle, would be a second alternate design wherein a hydraulic motor such as hydraulic motor 86 in FIG. 4 would be placed in series with a fluid line to at least one of the wheels of the harvester being hydraulically driven. This control arrangement could be adapted to effectively sense or monitor ground speed and drive the defoliator assembly in proportion to harvester ground speed. In addition control valves of a flow divider type might be provided for adjusting the flow of fluid to the hydraulic motor.

In the foregoing specification, the hydraulic defoliator speed control system has been described in conjuction with the Splinter Knife Head type Defoliator. It will be appreciated and understood by those skilled in the art that the control system of the present invention may be advantageous and applicable to other types of defoliator assemblies even the conventional Suggs sprial type defoliator described in U.S. Pat. No. 2,834,174. Of particular significance, however, is the application of the control system of the present invention in defoliator assemblies having defoliating elements that project transversely into the plane of the row such as the conventional and well known fingerbar type and the Splinter Defoliator discussed herein.

The terms "upper," "lower," "forward," "rearward," etc., have been used herein merely for the convenience of the foregoing specification and in the appended Claims to describe the tobacco harvester having a hydraulic control system for continuously controlling the speed of a leaf defoliator assembly and its parts as oriented in the drawings. It is to be understood, however, that these terms are in no way limiting to the invention since the tobacco harvester having a hydraulic control system for continuously controlling the speed of a leaf defoliator assembly may obiviously be disposed in many different positions when in actual use. As used herein, "horizontal speed," "rearward speed," and "rearward horizontal speed" mean the speed at which respective defoliator elements move between points horizontally spaced apart.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. In an automatic tobacco harvester of the type having a wheel supported mobile frame adapted to move through a tobacco field, a leaf defoliator assembly mounted on said frame and having defoliating elements that are adapted to defoliate tobacco leaves from successive tobacco stalks aligned in a row as the harvester moves through the tobacco field, defoliator drive means operatively connected to the defoliator assembly for driving said defoliator assembly, and a leaf conveyor assembly means mounted on said mobile frame and operative to receive the defoliated tobacco leaves and to convey them to a collection area operatively associated with said tobacco harvester; the improvement comprising: an automatic hydraulic speed control system for continuously and automatically controlling and maintaining the speed of the defoliator assembly relative to and in proportion to the ground speed of said tobacco harvester as said harvester moves through the field during a harvesting operation, said automatic hydraulic speed control system including hydraulic motor means operatively connected to said defoliator drive means for driving the same; a hydraulic fluid flow control unit operatively connected to a source of hydraulic fluid and operatively associated with said hydraulic motor means for driving the same; and said hydraulic fluid flow control unit of said hydraulic speed control system having control means operatively associated therewith and continuously responsive to harvester ground speed and changes for automatically directing according to harvester ground speed a system of fluid with a volumetric flow rate generally proportional to the harvester ground speed from said hydraulic fluid flow control unit to said hydraulic motor means for continuously driving said defoliator assembly at a speed generally proportional to the ground speed of said tobacco harvester such that the speed of the said defoliator assembly is continuously controlled and maintained at a speed proportional to the ground speed of said tobacco harvester irrespective of changes in the harvester ground speed as it moves through the tobacco field.

2. The automatic tobacco harvester and improved hydraulic defoliator speed control system of claim 1 wherein said control means includes:
   a variable displacement hydraulic pump operatively connected to said hydraulic motor that drives said defoliator drive means, and adapted to drive the same hydraulic motor by driving a system of fluid to and from the hydraulic motor;
   said variable displacement hydraulic pump having means associated therewith for varying the volumetric fluid output to said hydraulic motor independently of the driven speed of said variable displacement hydraulic pump; and
   a main drive hydraulic motor operatively connected to said variable displacement hydraulic pump for driving the same, said main hydraulic motor being operatively connected within a hydraulic wheel drive system of the harvester such that the same is driven in proportion to the harvester ground speed.

3. The automatic tobacco harvester and the improved hydraulic defoliator speed control system of claim 1 wherein said control unit and the control means thereof includes: a hydraulic pump means operatively connected between a source of hydraulic fluid and said hydraulic motor that drives said defoliator drive means for driving said hydraulic motor by directing a system of fluid to and from the hydraulic motor; and drive means responsive to harvester ground speed for driving said hydraulic pump means in proportion to harvester ground speed.

4. The automatic tobacco harvester and improved hydraulic defoliator speed control system of claim 3 wherein said drive means for driving said hydraulic pump means includes a main drive hydraulic motor operatively connected in a hydraulic wheel drive system associated with said harvester, said main drive hydraulic motor being connected in series with at least one wheel being propelled by said harvester's hydraulic wheel drive system and operatively connected to said hydraulic pump means for driving the same.

5. In an automatic tobacco harvester of the type having a wheel supported mobile frame adapted to move through a tobacco field, a leaf defoliator assembly having defoliating elements associated therewith mounted on said frame and adapted to be driven so as to engage and defoliate tobacco leaves from successive tobacco stalks aligned in a row as the harvester moves through the tobacco field, and a leaf conveyor assembly means mounted on said mobile frame and operative to receive the defoliated tobacco leaves and to convey them to a collection area operatively associated with said tobacco harvester; the improvement comprising an automatic hydraulic speed control system for automatically and continuously controlling and maintaining the rearward speed of the defoliating elements of said defoliator assembly approximately equal to the forward ground speed of said tobacco harvester as said harvester moves through the field during a harvesting operation, said automatic hydraulic speed control system comprising: hydraulic drive means operatively connected to the defoliator assembly for driving said defoliator assembly as said tobacco harvester moves through the field; a hydraulic speed control unit operatively connected to a source of hydraulic fluid and to said hydraulic defoliator drive means for driving the same; and said hydraulic speed control unit having means operatively associated therewith for continuously effectively sensing the ground speed of said harvester and variations in the ground speed of said harvester and for causing a system of fluid to be directed from said hydraulic speed control unit to said hydraulic defoliator drive means at certain rates for continuously driving said defoliator assembly at a speed proportional to the effectively sensed ground speed of said tobacco harvester such that the rearward speed of the defoliating elements is continuously controlled and maintained at a speed approximately equal to the forward ground speed of said tobacco harvester irrespective of changes in the harvester forward ground speed as it moves through the tobacco field.

6. A tobacco harvester having an automatic hydraulic speed control system for varying and continuously controlling and maintaining the operating speed of a leaf defoliator assembly relative to and in proportion to the ground speed of said harvester, comprising in combination: a mobile frame structure; ground engaging wheel means rotatively mounted on said mobile frame; a hydraulic wheel drive system operatively disposed on said harvester and operatively connected to said ground engaging wheel means for hydraulically driving the same; a leaf defoliator assembly mounted on said mobile frame and having a plurality of lead defoliating elements that are adapted during leaf defoliation to extend transversely between successive stalks and wherein adjacent pairs of said defoliating elements closely surround portions of each stalk and move vertically up the stalk to effectuate defoliation and rearwardly therewith as the stalk passes through the defoliator assembly; defoliator drive means for driving said defoliator assembly and including a defoliator hydraulic drive motor operatively connected to said defoliator assembly for driving the same; a leaf conveyor assembly disposed on said mobile frame and operative to receive tobacco leaves defoliated by said defoliator assembly and to convey the defoliated leaves to a collection area operatively associated with said harvester; and an automatic hydraulic speed control system operatively connected to said defoliator drive means for automatically and continuously controlling and maintaining the speed of said defoliator assembly at a speed which is a fixed ratio with respect to the ground speed of said harvester, said automatic hydraulic speed control means comprising a hydraulic pump means operatively connected to said defoliator hydraulic drive motor of said defoliator drive means for fluidly driving the same and consequently driving the same and consequently driving said leaf defoliator assembly; a hydraulic motor means operatively connected to said hydraulic wheel drive system and hydraulically driven thereby only when at least one wheel of said ground engaging wheel means is driven by said hydraulic wheel drive system, said hydraulic wheel drive system being effective to automatically drive said hydraulic motor means at various speeds proportional to the ground speed of said harvester, and said hydraulic motor means being drivingly interconnected to said hydraulic pump means for driving the same at the speed corresponding to its driven speed and in a fixed ratio to the ground speed of said harvester; and means for varying the fluid output of said hydraulic pump means independently of the driven speed thereof for synchronizing the average rearward horizontal speed of each defoliating element with the forward ground speed of said harvester such that during leaf defoliation respective defoliating elements move at an average horizontal and rearward speed that approximates the general forward ground speed of said harvester irrespective of the speed of the harvester or changes therein during the harvesting operation.

7. A tobacco harvester having an automatic hydraulic speed control system for automatically varying and continuously controlling and maintaining the operating speed of a leaf defoliator assembly relative to and in proportion to the ground speed of said harvester, comprising in combination: a wheel supported mobile frame structure adapted to move through a tobacco field; a leaf defoliator assembly mounted on said mobile frame and having a plurality of laterally spaced defoliating elements adapted during leaf defoliation to extend transversely between successive stalks and wherein adjacent pairs of said defoliating elements closely surround portions of each stalk and move vertically up the stalk to effectuate defoliation and rearwardly therewith due to a horizontal and rearward component as the stalk passes through the defoliator assembly; a leaf conveyor assembly disposed on said mobile frame and operative to receive tobacco leaves defoliated by said defoliator assembly and to carry the defoliated leaves to a collection area operatively associated with said harvester; hydraulic drive means operatively connected to said defoliator assembly for driving the defoliator assembly as said tobacco harvester moves through the field; a hydraulic speed control unit operatively connected to a source of hydraulic fluid and including a hydraulic pump means for driving said hydraulic drive means and the defoliator assembly operatively connected thereto; said hydraulic speed control unit having means operatively associated therewith and automatically and continuously responsive to the ground speed of said harvester and variations therein for automatically and continuously driving said hydraulic pump means at a speed proportional to said harvester ground speed and thereby directing a system of fluid with a volumetric flow rate generally proportional to the ground speed of said harvester from said hydraulic speed control unit to said hydraulic defoliator drive means for continuously driving said defoliator assembly at a speed generally proportional to the ground speed of said harvester such that the speed of said defoliator assembly is continuously controlled and maintained at a speed proportional to the ground speed of said tobacco harvester irrespective of changes in the harvester ground speed as it moves through the field; said hydraulic pump means of said hydraulic speed control unit further including adjustable flow control means for varying and adjusting the volumetric flow of said fluid from said hydraulic speed control unit independently of said harvester ground speed and independently of the driven speed of said hydraulic pump means, and for consequently varying and adjusting the average horizontal and rearward speed of the defoliating elements of said defoliator assembly during leaf defoliation to generally equal the forward ground speed of said harvester such that the average horizontal and rearward speed of said defoliating elements during leaf defoliation is continuously generally equal to the forward ground speed of said harvester and varies in a proportional relationship therewith.

8. A tobacco harvester having an automatic hydraulic speed control system for continuously controlling and maintaining the operating speed of a tobacco leaf defoliator assembly relative to and in proportion to the ground speed of said tobacco harvester, said harvester and control system comprising in combination:
  a. a mobile frame adapted to move through a tobacco field during a tobacco harvesting operation;
  b. ground engaging wheel means rotatively mounted to said mobile frame;
  c. a hydraulic wheel drive system disposed on said harvester and operative to drive said ground engaging wheel means;
  d. a tobacco leaf defoliator assembly mounted on said mobile frame and including a pair of defoliator units disposed in lateral spaced apart relationship so as to permit passage of tobacco stalks therebetween as said harvester moves through the field, at least one of said defoliating units including a plurality of members with each member having a series of spaced apart leaf defoliating elements fixed thereto and extending therefrom, said members being mounted for cyclic movement about an endless path that may be generally described in part at least as including movement inwardly toward respective stalks of the row being harvested to where the leaf defoliating elements project into the plane of the stalk row between respective stalks passing between the defoliating units, vertical leaf defoliating movement with a horizontal and rearward component that enables respective defoliating elements to be maintained generally parallel to the axis of the particular stalks passing adjacent thereto as the harvester moves forwardly wherein the defoliating elements act to engage and defoliate leaves from the respective tobacco stalks as they move vertically adjacent the stalks, and outward movement retracting said members and the defoliating elements associated therewith from the respective tobacco stalks;
  e. defoliator drive means for driving said defoliator assembly and including a defoliator hydraulic drive motor operatively connected to said defoliator assembly for driving the same;
  f. a leaf conveyor assembly disposed on said mobile frame and operative to receive tobacco leaves defoliated by said defoliator assembly and to carry the defoliated leaves to a collection area operatively associated with said harvester; and
  g. an automatic hydraulic speed control system operatively connected to said defoliator drive means for continuously controlling and maintaining the speed of said defoliator assembly at a speed proportional to the ground speed of said harvester, said automatic hydraulic speed control system comprising:
    1. a hydraulic drive motor means operatively connected into said hydraulic wheel drive system and driven thereby only when said ground engaging wheel means of said harvester is driven;
    2. a hydraulic pump means operatively connected to said hydraulic motor means of said hydraulic speed control system and driven thereby only when said ground engaging wheel means is driven by said hydraulic wheel drive system, said hydraulic pump means being also operatively connected to a source of hydraulic fluid and adapted when driven to produce an output flow of fluid out of an output port formed therein;
    3. means interconnecting said output port of said hydraulic pump means with said defoliator hydraulic motor of said defoliator drive means wherein the output fluid of said hydraulic pump means drives said defoliator hydraulic motor which in turn is operative to drive said defoliator assembly; and
    4. means for automatically varying and adjusting the speed of said defoliator assembly such that the rearward speed of each defoliating element during the defoliating portion of the movement cycle is approximately equal to the forward ground speed of said harvester, and as such it follows that any two defoliating elements that partially surround a respective stalk passing between the defoliating units remain generally parallel to the axis of the stalk and moves rearwardly therewith as the stalk passes between said defoliating units, said means for automatically varying and adjusting the speed of said defoliator assembly including means for varying the fluid output of said hydraulic pump means independently of the driven speed thereof and consequently driving said defoliator hydraulic motor at a speed that will result in a direct and approximate one-to-one speed relationship between the rearward speed of each defoliating element and the forward ground speed of said harvester.

* * * * *